(12) United States Patent
Tsai

(10) Patent No.: US 9,969,456 B2
(45) Date of Patent: *May 15, 2018

(54) COLLAPSIBLE SKATEBOARD

(71) Applicant: RAZOR USA LLC, Cerritos, CA (US)

(72) Inventor: Shui-Te Tsai, Taipei (TW)

(73) Assignee: RAZOR USA LLC, Cerritos, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/240,244

(22) Filed: Aug. 18, 2016

(65) Prior Publication Data

US 2017/0043837 A1  Feb. 16, 2017

Related U.S. Application Data

(63) Continuation of application No. 14/789,785, filed on Jul. 1, 2015, now Pat. No. 9,422,021, which is a continuation of application No. 13/931,265, filed on Jun. 28, 2013, now abandoned, which is a continuation of application No. 13/441,741, filed on (Continued)

(51) Int. Cl.
  *B62K 15/00* (2006.01)
  *B62K 3/00* (2006.01)

(52) U.S. Cl.
  CPC ............ *B62K 15/006* (2013.01); *B62K 3/002* (2013.01); *B62K 15/00* (2013.01); *B60Y 2304/05* (2013.01); *B62K 2700/56* (2013.01); *Y10T 16/5444* (2015.01); *Y10T 403/32327* (2015.01)

(58) Field of Classification Search
  CPC ...... B62K 3/002; B62K 15/00; B62K 15/006; A63C 17/01; A63C 2203/10
  See application file for complete search history.

(56) References Cited

U.S. PATENT DOCUMENTS

| 606,525 A | 6/1898 | Dunning |
| 628,433 A | 7/1899 | Finch |

(Continued)

FOREIGN PATENT DOCUMENTS

| DE | 19711042 A1 | 9/1998 |
| FR | 0396141 | 4/1909 |
| GB | 699673 A | 11/1953 |

OTHER PUBLICATIONS

Dirt King, "Declaration of James R. Funk",—Alleged public use and service in 1985; drawings and xerographic copies of photographs, Dec. 14, 2000.

(Continued)

*Primary Examiner* — Katy M Ebner
(74) *Attorney, Agent, or Firm* — Knobbe Martens Olson & Bear, LLP

(57) ABSTRACT

A collapsible skateboard includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector, whereby the skateboard can be easily folded up as desired.

21 Claims, 6 Drawing Sheets

Related U.S. Application Data

Apr. 6, 2012, now Pat. No. 8,474,840, which is a continuation of application No. 12/495,490, filed on Jun. 30, 2009, now Pat. No. 8,157,275, which is a continuation of application No. 11/471,059, filed on Jun. 19, 2006, now Pat. No. 7,559,561, which is a continuation of application No. 10/217,123, filed on Aug. 13, 2002, now Pat. No. 7,063,341, which is a continuation of application No. 09/816,311, filed on Mar. 26, 2001, now Pat. No. 6,431,567, which is a continuation of application No. 09/222,840, filed on Dec. 30, 1998, now Pat. No. 6,206,387.

(56) References Cited

U.S. PATENT DOCUMENTS

| | | | | |
|---|---|---|---|---|
| 730,622 | A | 6/1903 | Milton | |
| 1,297,282 | A | 3/1919 | White | |
| 1,345,038 | A | 6/1920 | Uppling | |
| 1,391,312 | A | 9/1921 | Gebhardt | |
| 1,534,601 | A | 4/1925 | Matveyeff | |
| 1,570,189 | A | 1/1926 | Sturm | |
| 1,614,822 | A | 1/1927 | Bukolt | |
| 1,653,558 | A | 12/1927 | Fisher | |
| 1,658,068 | A * | 2/1928 | White | B62K 3/002 280/14.25 |
| 1,687,739 | A | 10/1928 | Slusher | |
| 1,687,953 | A * | 10/1928 | Starks | B25G 3/38 403/58 |
| 1,701,410 | A | 2/1929 | Hornquist | |
| 1,714,000 | A | 5/1929 | Davis | |
| 1,968,975 | A | 8/1934 | Upsacker et al. | |
| 2,198,667 | A | 4/1940 | Hagenes | |
| 2,439,556 | A | 4/1948 | Bancroft | |
| 2,460,395 | A | 2/1949 | Reid | |
| 2,546,711 | A * | 3/1951 | Amendt | B62K 3/002 16/346 |
| 3,006,659 | A | 10/1961 | Krasnoff | |
| 3,288,251 | A | 11/1966 | Paul | |
| 3,396,928 | A * | 8/1968 | Lay | A47B 3/0815 108/129 |
| 3,484,116 | A | 12/1969 | Allen | |
| 3,684,305 | A | 8/1972 | Mcdonald | |
| 3,876,217 | A | 4/1975 | Henri | |
| 3,891,225 | A | 6/1975 | Sessa | |
| 4,003,582 | A | 1/1977 | Maurer | |
| 4,033,596 | A | 7/1977 | Andersen | |
| 4,088,334 | A | 5/1978 | Johnson | |
| 4,102,541 | A | 7/1978 | Altorfer et al. | |
| 4,103,917 | A | 8/1978 | Widolf | |
| 4,144,822 | A * | 3/1979 | Roberts | A47B 3/0815 108/125 |
| 4,166,629 | A | 9/1979 | List | |
| 4,169,687 | A | 10/1979 | Schull | |
| 4,179,134 | A | 12/1979 | Atkinson | |
| 4,202,559 | A | 5/1980 | Piazza, Jr. | |
| 4,394,029 | A | 7/1983 | Holmgren | |
| 4,584,735 | A | 4/1986 | Garber | |
| 4,707,884 | A | 11/1987 | Chang | |
| 4,735,392 | A | 4/1988 | Farmer | |
| 4,790,550 | A | 12/1988 | Simpson | |
| 4,795,181 | A | 1/1989 | Armstrong | |
| 4,799,701 | A | 1/1989 | Lindau | |
| 4,905,946 | A | 3/1990 | Wang | |
| 5,042,622 | A | 8/1991 | Smith | |
| 5,102,079 | A | 4/1992 | Lee | |
| 5,183,129 | A * | 2/1993 | Powell | B62K 3/002 180/208 |
| 5,192,099 | A | 3/1993 | Riutta | |
| 5,238,082 | A * | 8/1993 | Stegeman | B60K 1/00 180/208 |
| 5,320,367 | A | 6/1994 | Landis | |
| 5,383,536 | A | 1/1995 | Butter et al. | |
| 5,437,425 | A | 8/1995 | Hou | |
| 5,630,633 | A * | 5/1997 | Dupre | A01B 1/222 294/53.5 |
| 5,692,761 | A | 12/1997 | Havlovitz | |
| 5,816,614 | A * | 10/1998 | Kramer, Jr. | B62D 1/14 180/208 |
| 5,848,660 | A * | 12/1998 | McGreen | B62K 15/006 180/208 |
| 5,927,733 | A | 7/1999 | Banda | |
| 5,938,223 | A | 8/1999 | Kotlier | |
| 5,992,566 | A | 11/1999 | Yeh | |
| 6,120,044 | A * | 9/2000 | Tsai | B62K 3/002 280/639 |
| 6,139,035 | A | 10/2000 | Tsai | |
| D435,873 | S | 1/2001 | Lee | |
| 6,179,307 | B1 | 1/2001 | Mao | |
| 6,182,988 | B1 | 2/2001 | Wu | |
| D438,912 | S | 3/2001 | Barrera | |
| D439,623 | S | 3/2001 | Barrera | |
| 6,206,387 | B1 | 3/2001 | Tsai | |
| D446,259 | S | 8/2001 | Udwin et al. | |
| D447,187 | S | 8/2001 | Powers | |
| D452,284 | S | 12/2001 | McGinnis | |
| 6,378,880 | B1 | 4/2002 | Lin | |
| 6,431,567 | B2 | 8/2002 | Tsai | |
| 7,063,341 | B2 | 6/2006 | Tsai | |
| 7,559,561 | B2 | 7/2009 | Tsai | |
| D654,963 | S | 2/2012 | Powers et al. | |
| 8,157,275 | B2 | 4/2012 | Tsai | |
| D671,600 | S | 11/2012 | Horne | |
| D684,217 | S | 6/2013 | Hadley | |
| 8,474,840 | B2 | 7/2013 | Tsai | |
| D691,671 | S | 10/2013 | Chen et al. | |
| D692,963 | S | 11/2013 | Radtke et al. | |
| 8,870,200 | B2 | 10/2014 | Chen | |
| D717,881 | S | 11/2014 | Radtke et al. | |
| 8,925,935 | B2 | 1/2015 | Powers et al. | |
| 9,422,021 | B2 | 8/2016 | Tsai | |
| 2002/0093161 | A1 | 7/2002 | Udwin et al. | |
| 2013/0320648 | A1 | 12/2013 | Eckert et al. | |

OTHER PUBLICATIONS

Sharper Image Catalogue, Aug. 1998.
Xerographic copy of photographs or advertisements relating to "K2" scooter, date unknown.
Xerographic copy photos or advertisements relating to "Rollerboard" scooter, date unknown.
Tranz X drawings, 1998.

* cited by examiner

COLLAPSIBLE SKATEBOARD

INCORPORATION BY REFERENCE TO ANY PRIORITY APPLICATIONS

This application is a continuation of U.S. patent application Ser. No. 14/789,785, filed Jul. 1, 2015, pending, which is a continuation of U.S. patent application Ser. No. 13/931, 265, filed Jun. 28, 2013, now abandoned, which is a continuation of U.S. patent application Ser. No. 13/441,741, filed Apr. 6, 2012, now U.S. Pat. No. 8,474,840, which is a continuation of U.S. patent application Ser. No. 12/495,490, filed Jun. 30, 2009, now U.S. Patent No. 8,157,275, which is a continuation of U.S. patent application Ser. No. 11/471, 059, filed Jun. 19, 2006, now U.S. Pat. No. 7,559,561, which is a continuation of U.S. patent application Ser. No. 10/217, 123, filed Aug. 13, 2002, now U.S. Pat. No. 7,063,341, which is a continuation of U.S. patent application Ser. No. 09/816,311, filed Mar. 26, 2001, now U.S. Patent No. 6,431,567, which is a continuation of U.S. patent application Ser. No. 09/222,840, filed Dec. 30, 1998, now U.S. Pat. No. 6,206,387, the entireties of which are incorporated by reference herein and made a part of the present disclosure.

BACKGROUND OF THE INVENTION

Field of the Invention

This invention is related to an improvement in the structure of a collapsible skateboard.

Description of the Related Art

The conventional skateboard with an upright handle is fixed in structure so that it is difficult to carry. Hence, a collapsible skateboard has been developed to obviate this drawback. However, such a collapsible skateboard is complicated in structure and expensive in cost. Furthermore, the handle of the collapsible skateboard cannot be kept at a fixed position, thereby making it inconvenient to use.

SUMMARY OF THE INVENTION

Therefore, it is an object of the present invention to provide an improved collapsible skateboard which can obviate and mitigate the above-mentioned drawbacks.

This invention is related to an improvement in the structure of a collapsible skateboard.

It is the primary object of the present invention to provide a collapsible skateboard that includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector.

It is another object of the present invention to provide a collapsible skateboard wherein the connection is a U-shaped member having two upwardly extending lugs each formed with the curved slot.

It is still another object of the present invention to provide a collapsible skateboard further comprising a control mechanism which includes a cylindrical member pivotally mounted on the bracket and having an end extending out of the bracket to fixedly connect with a lever and a hook extending downwardly within the bracket to engage with the adjust pin.

It is still another object of the present invention to provide a collapsible skateboard which can be easily folded as desired.

It is a further object of the present invention to provide a collapsible skateboard which is simple in construction.

DETAILED DESCRIPTION OF THE PREFERRED EMBODIMENTS

Figure 1:
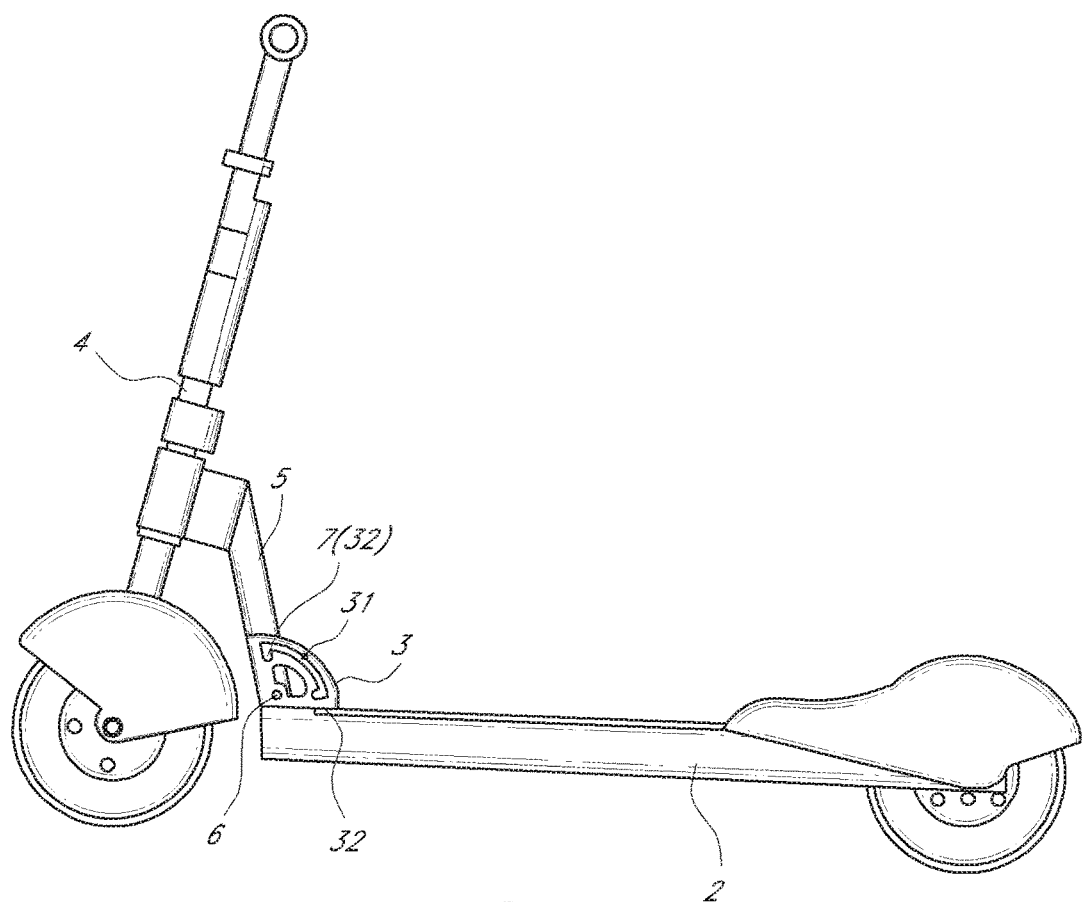
FIG. 1 is a side view of the present invention.
Figure 2:
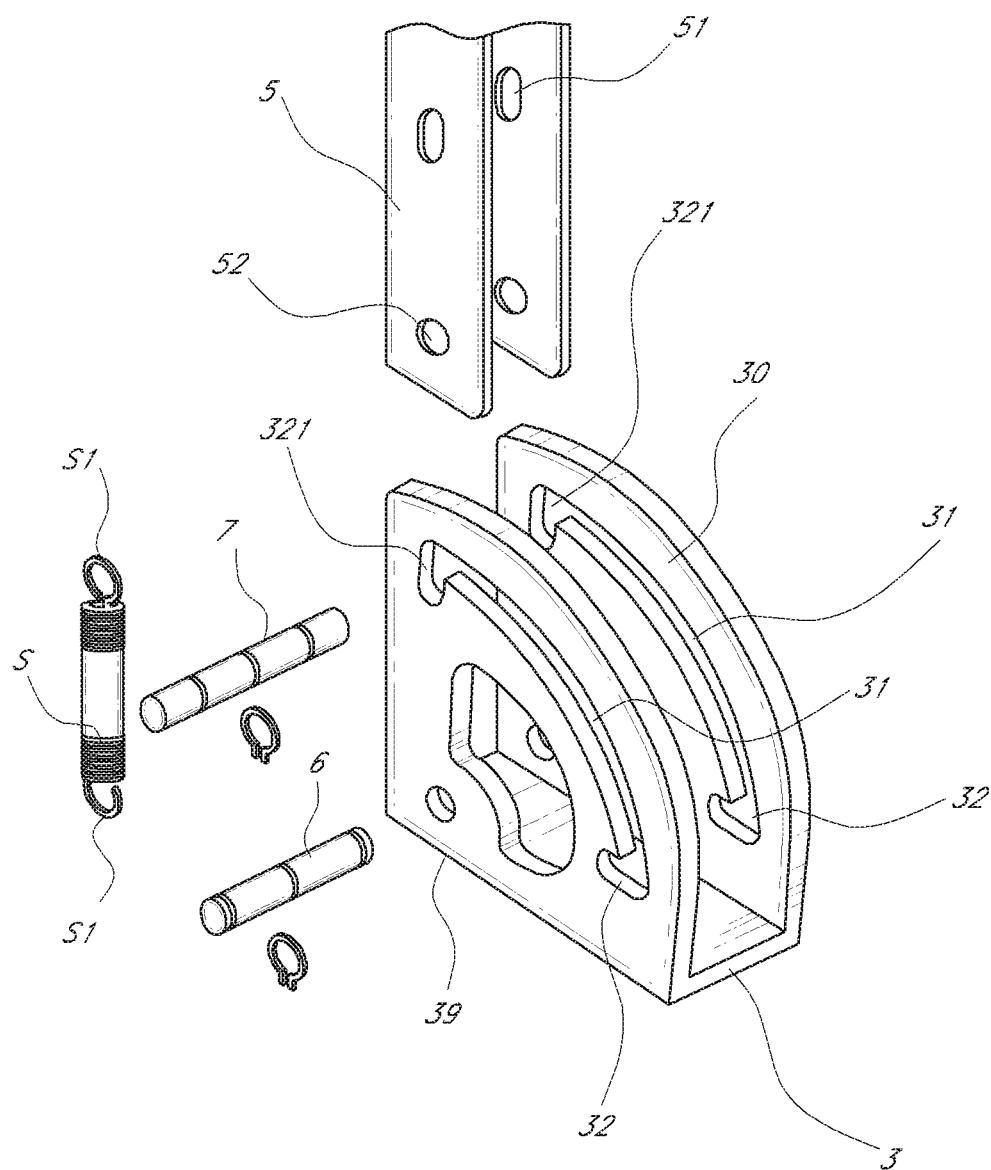
FIG. 2 is an exploded view of the present invention.
Figure 3:
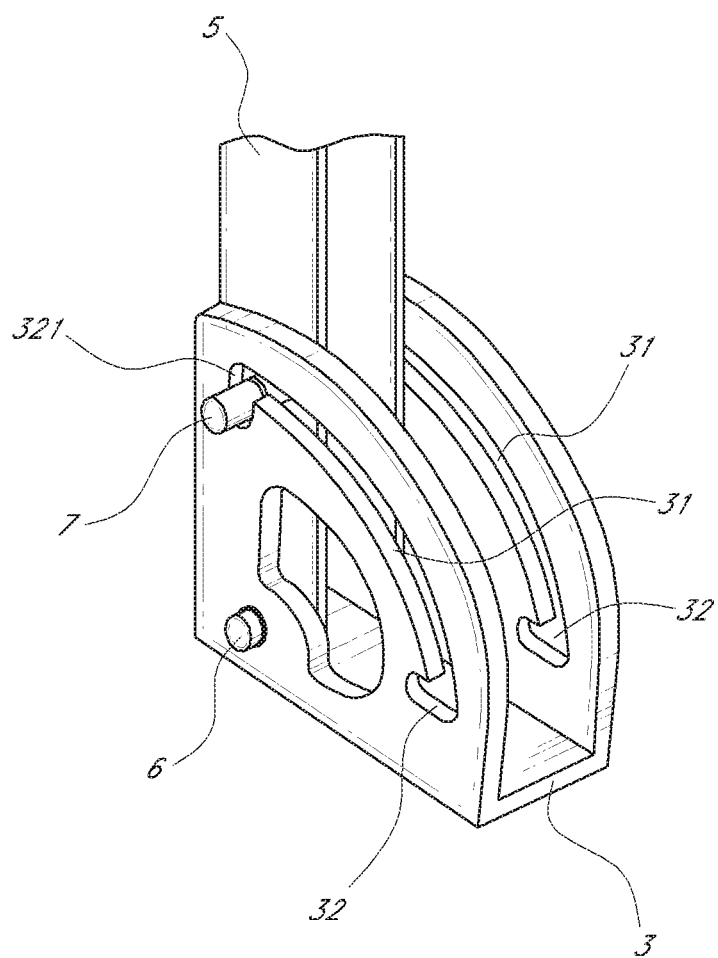
FIG. 3 is a perspective view of the present invention.
Figure 4:
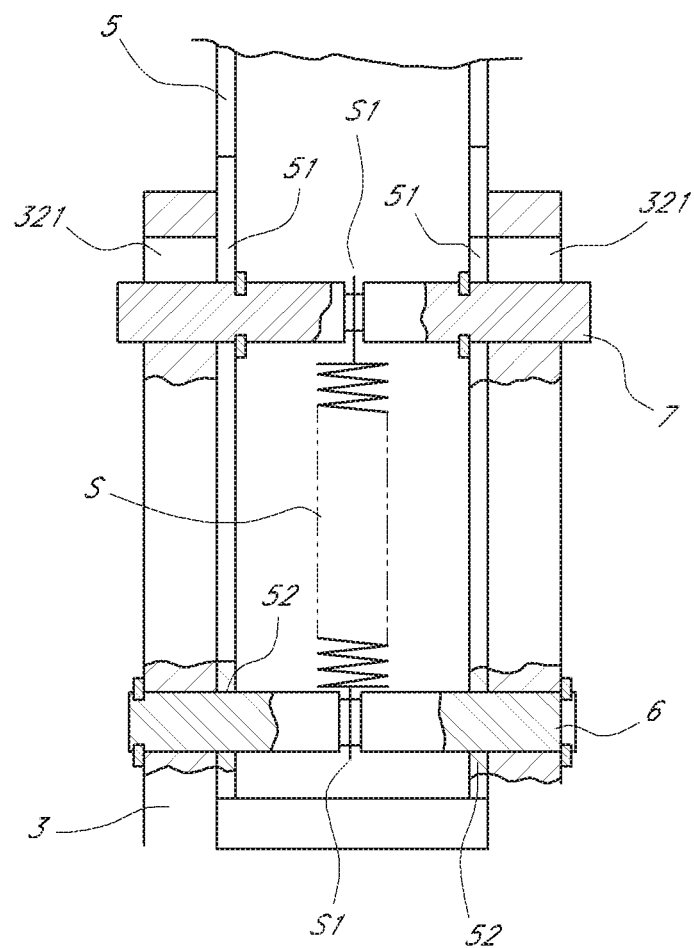
FIG. 4 is a sectional view of the present invention.

Referring to FIGS. 1, 2 and 3, the collapsible skateboard according to the present invention generally comprises an upright handle 4, a bracket 5, a connector 3 and a platform 2. The bracket 5 is fixedly mounted on the handle 4 and provided with two legs 5 extending downwardly toward the platform 2. Each leg 5 has an elongated hole 51 and a circular hole 52 below the elongated hole 51. The connector 3 is formed with two upwardly extending lugs 30 configured to receive the two legs 5 therein. Each of the lugs 30 has a curved slot 31 formed with a horizontal recess 32 at the lower end and a vertical recess 321 at the upper end. Each lug 30 is further formed with a circular hole 39 below the vertical recess 321. An adjust sin 7 is inserted into the vertical recesses 321 of the connector 3 and the elongated holes 51 of the bracket 5. A pivot pin 6 is fitted through the circular holes 39 of the connector 30 and the circular holes 52 of the bracket 5 so that the handle 4 together with the bracket 5 can be folded on the platform 2. A spring S has an upper end 51 connected to the intermediate portion of the adjust pin 7 and a lower end connected to the intermediate portion of the pivot pin 6 so that the adjust pin 7 will be retained within the vertical recess 5321 thereby keeping the handle 4 at an upright position.

Figure 5:
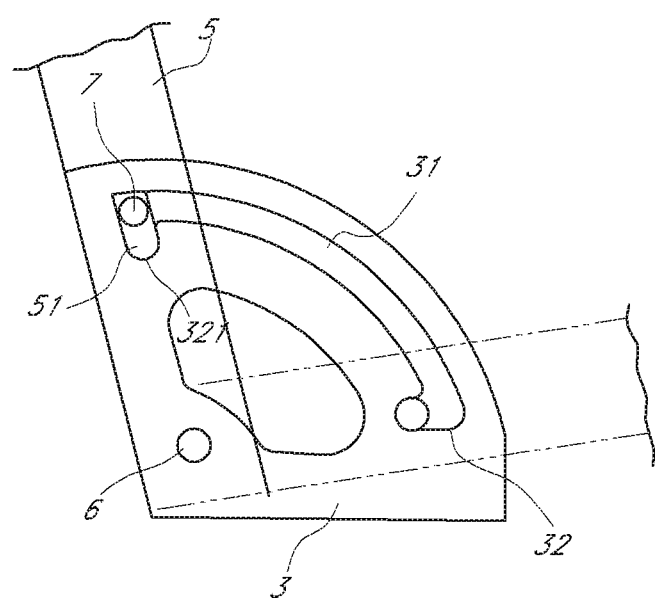
FIG. 5 illustrates the working principle of the present invention.

When desired to fold the skateboard, it is only necessary to move the adjust pin 7 upwardly out of the vertical recesses 321 and then move the handle 4 together with the bracket 5 toward the platform 2 so that the adjust pin 7 is moved along the curved slots 31 to engage with the horizontal recesses 32 (see FIG. 5). When in use, simply move the handle 4 along the direction away from the platform 2 so that the adjust pin 7 is moved along the curved slots 31 to engage with the vertical recesses 321.

Figure 6A:
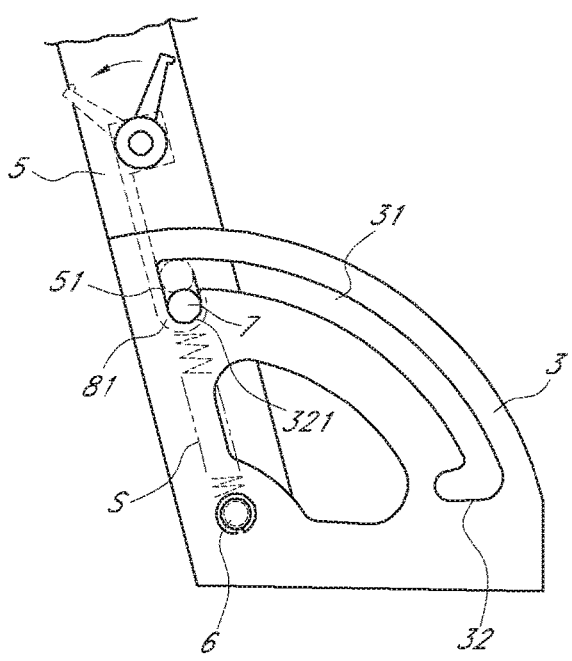
FIGS. 6A and 6B illustrate another preferred embodiment of the present invention.
Figure 6B:
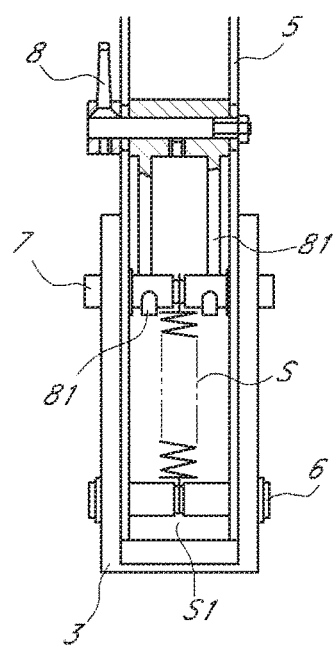

FIGS. 6A and 6B illustrate another preferred embodiment of the present invention. As shown, a control mechanism 8 is pivotally mounted on the bracket 5 and arranged above the adjust pin 7. The control mechanism 8 includes a cylindrical member pivotally mounted on the bracket 5 and having an end extending out of the bracket 5 to fixedly connect with a lever 8 and a hook 81 extending downwardly within the bracket 5 to engage with the adjust pin 7, so that the adjust pin 7 can be moved upwardly out 5 of the vertical recesses 321 by turning the lever 8 thereby enabling the handle 4 to fold on the platform 2 as desired.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

What is claimed is:

1. A collapsible scooter, comprising:
   a first portion comprising a handle and supporting a front wheel;
   a second portion supporting a rear wheel, wherein the first portion and the second portion are rotatably coupled for relative movement between a first position and a second position;
   a pin supported by the first portion, the pin having a longitudinal axis;
   a mechanical link; and
   a lever coupled to the mechanical link, wherein the lever is configured to move the mechanical link to permit the collapsible scooter to move from the first position to the second position, the lever having an axis of rotation that is offset from the longitudinal axis of the pin,
   wherein the mechanical link joins the pin and the lever; and
   wherein the lever and the mechanical link are supported by the first portion.

2. The collapsible scooter of claim 1, wherein the mechanical link and the pin are configured to move with rotation of the lever.

3. The collapsible scooter of claim 2, wherein the direction of movement of the pin in response to rotation of the lever is perpendicular to the longitudinal axis of the pin.

4. The collapsible scooter of claim 1, wherein the mechanical link is configured to rotate with rotation of the lever.

5. The collapsible scooter of claim 1, further comprising a biasing member at least partially coupled to the pin, wherein the second portion includes a recess, and wherein the biasing member is configured to bias the pin in a direction tending to engage the pin with the recess.

6. The collapsible scooter of claim 1, wherein the first portion includes an inner wall and the mechanical link is supported at least partially within the inner wall of the first portion.

7. The collapsible scooter of claim 1, wherein the first portion includes an elongate bracket portion and at least a portion of the mechanical link is substantially parallel to the elongate bracket portion.

8. The collapsible scooter of claim 1, wherein the mechanical link includes a hook.

9. The collapsible scooter of claim 1, wherein the first portion includes walls defining an inner area, and at least a portion of the mechanical link is positioned within the inner area.

10. A collapsible scooter, comprising:
    a first portion comprising a handle, wherein the first portion is configured to support a front wheel;
    a second portion supporting a rear wheel, the second portion comprising a connector having a first recess and a second recess, wherein the first portion is rotatably coupled to the connector for relative movement between a first position and a second position;
    a movable pin oriented parallel to a pivoting axis of the first portion relative to the connector, the movable pin movable independent of the connector and positionable into engagement with the first recess to secure the collapsible scooter in the first position and positionable into engagement with the second recess to secure the collapsible scooter in the second position; and
    a control mechanism that configured to move the movable pin to release the movable pin from the first recess and to release the movable pin from the second recess, wherein the control mechanism converts a rotational motion of a lever of the control mechanism into a linear motion of the movable pin; and
    a biasing member configured to bias the movable pin towards a wall of the first recess in the first position.

11. The collapsible scooter of claim 10, wherein the movable pin is movable within an elongate slot of at least a portion of the second portion.

12. The collapsible scooter of claim 10, wherein the movable pin moves in a radial direction relative to the axis of rotation into engagement with the first and second recesses.

13. The collapsible scooter of claim 10, wherein an outer surface of the movable pin defines a groove configured to accommodate at least a portion of the biasing member.

14. The collapsible scooter of claim 10, wherein the first portion and the second portion are rotatably coupled by a pivot pin, and at least a portion of the biasing member is coupled to the pivot pin.

15. The collapsible scooter of claim 10, wherein the control mechanism includes a mechanical link that engages the movable pin.

16. The collapsible scooter of claim 15, wherein the mechanical link includes a hook.

17. The collapsible scooter of claim 10, wherein the biasing member includes a spring.

18. A collapsible scooter, comprising:
    a first portion comprising a handle and supporting a front wheel;
    a second portion supporting a rear wheel, wherein the first portion and the second portion are rotatably coupled for relative movement between a first position and a second position;
    a pin supported by the first portion, the pin having a longitudinal axis;
    a mechanical link; and
    a lever coupled to the mechanical link, wherein the lever is configured to move the mechanical link to permit the collapsible scooter to move from the first position to the second position, the lever having an axis of rotation that is offset from the longitudinal axis of the pin; and
    a biasing member at least partially coupled to the pin, wherein the second portion includes a recess, and wherein the biasing member is configured to bias the pin in a direction tending to engage the pin with the recess, and
    wherein the mechanical link joins the pin and the lever.

19. A foldable scooter comprising:
    a front portion comprising a handle and a steering axis, the front portion supporting a front wheel that is configured to rotate about a rolling axis, wherein the front wheel and the handle are pivotable about the steering axis that is different from the rolling axis;
    a rear portion comprising a deck supporting a rear wheel, the deck having a front region and a rear region positioned rearward of the front region along the deck, the deck configured to support a user; and a locking mechanism configured to secure the front portion to the rear portion in a folded position, the locking mechanism positioned on the front region of the deck and comprising:
  a slot comprising a recess;
  a pin configured to be received in the slot; and
  a spring configured to bias the pin into engagement with the recess when the foldable scooter is in the folded position;
the front portion and the rear portion being rotatably coupled for relative movement between the folded position and an unfolded position about a folding axis, wherein:
  the folding axis is positioned rearward of an outer circumference of the front wheel when the rolling axis of the front wheel of the front portion is generally perpendicular to the deck of the rear portion, and
  the folding axis is positioned above a plane extending along a top surface of the deck of the rear portion.

20. The scooter of claim 19, wherein the rear portion is configured to support a foot of the user.

21. The scooter of claim 19, further comprising a rotatable actuator that is accessible to the user, the rotatable actuator operatively connected to the pin such that rotation of the rotatable actuator moves the pin in or out of engagement with the slot.

* * * * *